United States Patent [19]

de Antoni et al.

[11] 3,846,430

[45] Nov. 5, 1974

[54] 1-(2-METHOXY-PHENYL)-4-[2-(4-FLUORO-BENZAMIDO)-ETHYL]-PIPERAZINE

[75] Inventors: Jacques de Antoni, Essonne; Raymonde Eche, Paris, both of France

[73] Assignee: Les Laboratoires Bruneau et Cie, Paris, France

[22] Filed: July 31, 1972

[21] Appl. No.: 278,602

Related U.S. Application Data

[63] Continuation of Ser. No. 888,087, Dec. 24, 1969, abandoned, which is a continuation-in-part of Ser. No. 733,754, June 3, 1968, abandoned.

[30] Foreign Application Priority Data

Jan. 12, 1968 France .............................. 68.135764
Apr. 11, 1968 France .............................. 68.147794

[52] U.S. Cl. ...... 260/268 PH, 260/268 CN, 424/250
[51] Int. Cl. ............................................. C07d 51/70
[58] Field of Search ............................... 260/268 PH

[56] References Cited
UNITED STATES PATENTS

| | | | |
|---|---|---|---|
| 2,722,529 | 11/1955 | Fleming ....................... | 260/268 PH |
| 3,005,821 | 10/1961 | Hayao ......................... | 260/268 PH |
| 3,274,194 | 9/1966 | Hayao ......................... | 260/268 PH |
| 3,488,352 | 1/1970 | Schipper et al ............... | 260/268 PH |
| 3,637,704 | 1/1972 | Umsmoto ...................... | 260/268 R |
| 3,707,477 | 12/1972 | Ost ........................... | 260/268 PH |
| 3,712,893 | 1/1973 | Mauvernay et al ............. | 260/268 PH |

FOREIGN PATENTS OR APPLICATIONS

| | | | |
|---|---|---|---|
| 1,543,944 | 9/1968 | France ........................ | 260/268 PH |
| 1,537,901 | 8/1968 | France ........................ | 260/268 PH |

*Primary Examiner*—Donald G. Daus
*Attorney, Agent, or Firm*—Stevens, Davis, Miller & Mosher

[57] ABSTRACT

The present invention provides novel substituted benzoic acid amides of the formula:

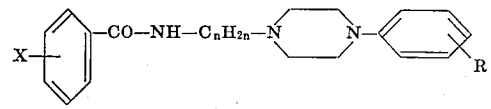

in which X represents one or more substituents selected from the group consisting of hydroxyl, nitro and halogen, R represents hydrogen, halogen, methyl, methoxy, or trifluoromethyl, and n is an integer from 2 to 5 inclusive, and their non-toxic salts, which are useful in therapy as analgesics; central nervous depressants, and tranquilizing agents.

1 Claim, No Drawings

1-(2-METHOXY-PHENYL)-4-[2-(4-FLUROR-BENZAMIDO)-ETHYL]-PIPERAZINE

This is a continuation of application Ser. No. 888,087, filed 12-24-69 which is, in turn, a continuation in part of application Ser. No. 733,754, filed June 3, 1968, both now abandoned.

The present invention provides, as new compounds, the substituted benzoic acid amides of the formula:

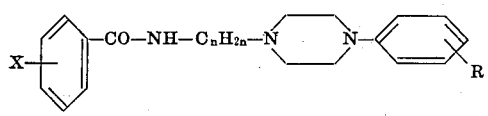

in which X represents one or more substituents selected from the group consisting of hydroxyl, nitro and halogen, especially fluorine or chlorine, R represents hydrogen, halogen, methyl, methoxy or trifluoromethyl, and n represents an integer from 2 to 5 inclusive, and their non-toxic salts with mineral or organic acids, and when X represents hydroxyl, their metal salts, especially with alkali metals.

Valuable compounds are those corresponding to the formula

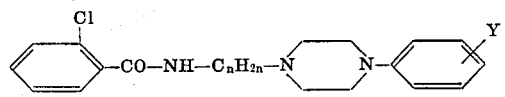

in which n represents 2 or 3 and Y represents Cl or $CF_3$, particularly the compound

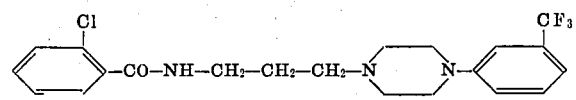

and their non-tonic salts with mineral or organic acids.

These new compounds are prepared by heating an ester of the formula:

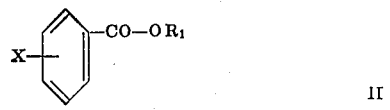

in which X is as hereinbefore defined and $R_1$ is alkyl of up to 3 carbon atoms or phenyl, with a compound of the formula:

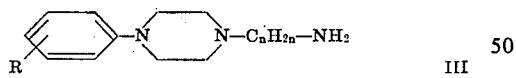

in which R and n are as hereinbefore defined.

The reaction may be carried out if desired in the presence of a catalyst such as an aluminium or alkali metal alcoholate, e.g. aluminium isopropoxide or sodium methoxide. The reaction can be carried out in the absence of a solvent using molten reactants, or in the presence of an inert solvent such as an aromatic hydrocarbon, for example xylene. When $R_1$ in formula II is a lower alkyl group, the corresponding alcohol may be distilled out of the reaction mixture as it is formed.

The compounds of formula I in which X represents nitro or halogen may also be prepared by reacting an acid chloride of the formula:

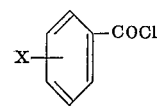

in which X is as hereinbefore defined, but is not hydroxyl, with a compound of formula III. The reaction may be carried out in the presence of an inert diluent such as chloroform or an aromatic hydrocarbon, or in a heterogeneous mixture in accordance with the Schotten-Baumann method.

The following Examples illustrate the invention.

EXAMPLE 1:

Method A

Methyl salicylate (15.2 g.) or ethyl salicylate (16.6 g.) and 5-(4-phenyl-1-piperazinyl)-n-propylamine (21.8 g.) are placed in a round-bottom flask and the mixture is heated to 200°C. with agitation until no more alcohol is distilled off. This requires about 8 hours. The mixture is cooled and dissolved in 25 ml. of isopropanol under reflux. After cooling, the crystalline product is filtered off and dried. The 3-(4-phenyl-1-piperazinyl) propylamide of salicylic acid is obtained, m.p. 116°C. Its hydrochloride, after recrystallisation from methanol, melts at 197°C.

Method B

Phenyl salicylate (21.4 g.), 3-(4-phenyl-1-piperazinyl)-n-propylamine (21.8 g.) and pure xylene (20 ml.) are placed in a round-bottom flask and heated for 3 hours under reflux. The mixture is cooled, the xylene is removed by evaporation under reduced pressure, and the residue is recrystallised from isopropanol. 3-(4-phenyl-1-piperazinyl) propylamide of salicylic acid is obtained, m.p. 116°C.

EXAMPLES 2–7

Following Method A or B Example 1, a (4-aryl-1-piperazinl)-alkylamine is reacted with an ester of salicylic acid. The compounds obtained are set out in the following Table.

| Example No. | (4-phenyl-1-piperazinyl)-alkylamine | m.p. (°C), recrystallisation solvent | Salt, m.p. (°C), recrystallisation solvent |
|---|---|---|---|
| 2 | 2-(4-phenyl-1-piperazinyl)-ethylamine | 103°, isopropanol-isopropyl ether | hydrochloride, 198°, ethanol-methanol |
| 3 | 4-(4-phenyl-1-piperazinyl)-n-butylamine | 110° isopropanol | hydrochloride, 237–8° methanol |
| 4 | 3-[4-(4-chlorophenyl)-1-piperazinyl]-n-propylamine | 116° isopropanol | hydrochloride 198°, methanol |
| 5 | 3-[4-(4-methylphenyl)-1-piperazinyl]-n-propylamine | 132° isopropanol | hydrochloride 207°, methanol |

-Continued

| Example No. | (4-phenyl-1-piperazinyl)-alkylamine | m.p. (°C), recrystallisation solvent | Salt, m.p. (°C), recrystallisation solvent |
|---|---|---|---|
| 6 | 3-[4-(3-methoxyphenyl)-1-piperazinyl]-n-propylamine | 77° isopropanol | hydrochloride 176°, ethanol |
| 7 | 3-[4-(3-chlorophenyl)-1-piperazinyl]-n-propylamine | 105° isopropanol | hydrochloride 193°, ethanol |

EXAMPLE 8:

(a) A mixture of N-(4-fluorophenyl) piperazine (18 g.) 4-chlorobutyronitrile (10.4 g.), isopropanol (40 ml.) and anhydrous potassium carbonate (13.8 g.) are heated under reflux with agitation for 20 hours. After cooling, the mixture is filtered, the solvent is evaporated, and the residue fractionally distilled. 4-[4-(4-fluorophenyl)-1-piperazinyl]-n-butyronitrile is obtained, b.p. 168°–172°C./0.01 mm.Hg., $n_D^{20}$ 32 1.5380.

b) This nitrile (24.7 g.) in solution in ethanol (125 ml.) saturated with ammonia is hydrogenated under a pressure of 80 kg./cm² at a temperature of 100°C. in the presence of Raney nickel (1.5 ml.). When no more hydrogen is absorbed, the pressure is released, the solution is filtered, the solvent is evaporated, and the residue is fractionally distilled. 4-[4-(4-fluorophenyl)-1-piperazinyl]-n-butylamine is obtained, b.p. 141°–145°C./0.01 mm.Hg., $n_D^{21}$ = 1.5420.

(c) Proceeding as in Examples 1 to 7, this substituted butylamine is converted into the 4-[4-(4-fluorophenyl)-1-piperazinyl]-n-butylamide of salicylic acid. m.p. 156°C. after recrystallisation from methanol. The hydrochloride of this compound melts at 200°–202°C. after recrystallisation from methanol.

EXAMPLES 9 & 10:

Proceeding as in Examples 1–8, the following salicylic acid amides are obtained:

tallises out in suspension. After 15 hours stirring at ambient temperature, the solid product is filtered off, washed with water and dried. After recrystallisation from ethanol (50 ml.) 4-[3-(4-fluorobenzamido)-1-propyl]-1-phenylpiperazine is obtained, m.p. 133°C.

The monohydrochloride is prepared by treating this base in solution in ethanol with the theoretical quantity of hydrogen chloride in solution in ethanol. It melts at 177°–178°C.

Method B.

A solution of 3-(4-phenyl-1-piperazinyl)-n-propylamine (21.9 g.) in chloroform (30 ml.) is added slowly and with cooling to a solution of 4-fluorobenzoyl chloride (15.8 g.) in chloroform (50 ml.). The mixture is allowed to stand for 15 hours at ambient temperature and then stirred in the presence of 10 percent ammonia solution (40 ml.). The organic phase is separated by decantation, washed with water, and dried over anhydrous sodium sulphate. The chloroform is then distilled off under reduced pressure. The residue is recrystallised from ethanol (60 ml.), and the same product is obtained as in Method A, m.p. 133°C.

Method C.

Methyl-4-fluorobenzoate (15.4 g.), 3-(4-phenyl-1-piperazinyl)-n-propylamine (21.9 g.), and xylene (40 ml.) are placed in a round-bottom flask and heated under reflux until the methanol/xylene azeotrope no longer distills off, or for about 30 hours. The xylene is then evaporated and the residue recrystallised from

| Examples No. | (4-aryl-1-piperazinyl)-alkylamine | m.p. (°C), recrystallisation solvent | Salt, m.p. (°C) recrystalisation solvent |
|---|---|---|---|
| 9 | 3-[4-(4-fluorophenyl)-1-piperazinyl]-n-propylamide | 127° isopropanol | hydrochloride; 173–174°; ethanol |
| 10 | 5-(4-phenyl-1-piperazinyl)-n-pentylamide | 85° isopropanol | hydrochloride; 190–192°; ethanol |

EXAMPLE 11:

Method A

A solution of 4-fluorobenzoyl chloride (15.8 g.) in benzene (30 ml.) is added to a mixture, cooled in ice, of 3-(4-phenyl-1-piperazinyl)-n-propylamine (21.9 g.) in benzene (20 ml.) and a 20 percent solution of sodium hydroxide (25 ml.) in the course of 45 minutes. During the course of this addition a solid product crysethanol. The same product is obtained as Methods A and B.

EXAMPLES 12 to 18:

Following Methods A, B or C of Example 11, a (4-aryl-1-piperazinyl) alkylamine is reacted with a benzoic acid chloride or ester, The compounds set out in the following Table are obtained.

| Example No. | (4-aryl-1-piperazinyl)-alkylamine | Benzoic acid chloride or ester | m.p. (°C.) recrystallisation solvent | Monohydrochloride m.p. (°C.) recrystallisation solvent |
|---|---|---|---|---|
| 12 | (4-phenyl-1-piperazinyl)-ethylamine | 4-fluorobenzoic acid | 175° ethanol | 218–200°, ethanol |
| 13 | 4-(4-phenyl-1-piperazinyl)-n-butylamine | do. | 150° ethanol | 233–235°, ethanol |

-Continued

| Example No. | (4-aryl-1-piperazinyl)-alkylamine | Benzoic acid chloride or ester | m.p. (°C.) recrystallisation solvent | Monohydrochloride m.p. (°C.) recrystallisation solvent |
|---|---|---|---|---|
| 14 | 4-[4-(4-fluorophenyl)-1-piperazinyl]-n-butylamine | 4-Flurorbenzoic acid | 148° ethanol | 226–230°, ethanol |
| 15 | 3-(4-phenyl-1-piperazinyl)-n-propylamine | 4-chlorobenzoic acid | 130° isopropyl alcohol | 195–196°, ethanol |
| 16 | do. | 2-chlorobenzoic acid | 101° isopropyl alcohol | 210–212°, ethanol |
| 17 | do. | 2,4-dichlorobenzoic acid | 94° isopropyl alcohol | 172–173°, ethanol |
| 18 | do. | 4-nitrobenzoic acid | 116° ethanol | 189–191°, ethanol |

EXAMPLE 19:

Method A

A solution of 2-fluorobenzoyl chloride (15.8 g.) in benzene (30 ml.) is added in the course of 45 minutes with stirring to a mixture, cooled in ice, of 3-(4-phenyl-piperazinyl)-n-propylamine (21.9 g.) in benzene (20 ml.) and 20 percent sodium hydroxide solution (25 ml.). The desired product separate out as a suspension during the addition. After 15 hours agitation at ambient temperature, the solid product is filtered off, washed with water, and dried. After recrystallisation from ethanol (50 ml.), 4-[3-(2-fluorobenzamido)-1-propyl]-1-phenyl-piperazine is obtained, m.p. 110°–111°C.

The monohydrochloride is prepared by treating this base in solution in ethanol with an equivalent of hydrogen chloride in solution in ethanol. It melts at 194°C. (dec.).

Method B

A solution of 3-(4-phenil-1-piperazinyl)-n-propylamine (21.9 g.) in chloroform (30 ml.) is added slowly with cooling to a solution of 2-fluorobenzoyl chloride (15.8 g.) in chloroform (50 ml.). The mixture is allowed to stand for 15 hours at ambient temperature and then agitated in the presence of 10 percent ammonia solution (40 ml.). The organic phase is separated by decantation, washed with water, and dried over anhydrous sodium sulphate. The chloroform is then evaporated under reduced pressure and the residue recrystallised from ethanol (50 ml.). The same product is obtained as in Method A, m.p. 110°–111°C.

Method C

A mixture of methyl 2-fluorobenzoate (15.4 g.), 3-(4-phenyl-1-piperazinyl)-n-propylamine (21.9 g.) and xylene (40 ml.) in a round-bottom flask is heated under reflux until methanol no longer distills off, or for about 30 hours. Xylene is then evaporated and the residue recrystallised from ethanol. The same product is obtained as in Methods A and B.

EXAMPLES 20 TO 49:

Following Method A, B or C of Example 19, a (4-aryl-1-piperazinyl) alkylamine is reacted with an appropriate benzoic acid chloride or ester. The products set out in the following Table are obtained.

| Example No. | (4-aryl-1-piperazinyl)-alkylamine | Benzoic acid chloride or ester | m.p. (°C) recrystallisation solvent | Monohydrochloride, m.p. (°C), recrystallisation solvent |
|---|---|---|---|---|
| 20 | 3-(4-phenyl-1-piperazinyl)-n-propylamine | 3-fluorobenzoic acid | 120–122°, ethanol | 161°(dec.), ethanol |
| 21 | do. | 3-chlorobenzoic acid | 111°, isopropanol | 168–169°(dec.), ethanol |
| 22 | 2-(4-phenyl-1-piperazinyl)-ethylamine | 2-chlorobenzoic acid | 126°, ethanol | 230°, ethanol |
| 23 | 4-(4-phenyl-1-piperazinyl)-n-butylamine | do. | 119–120°, isopropanol | 213–214° (dec.), isopropanol |
| 24 | 2-(4-phenyl-1-piperazinyl)-ethylamine | 4-nitrobenzoic acid | 174°, propanol | 216° (dec.), propanol |
| 25 | 4-(4-phenyl-1-piperazinyl)-n-butylamine | do. | 161°, ethanol | 233° (dec.), methanol |
| 26 | 3-(4-phenyl-1-piperazinyl)-n-propylamine | 3-nitrobenzoic acid | 112°, ethanol | 216° (dec.), ethanol |
| 27 | do. | 2-nitrobenzoic acid | 112°, ethanol | 245° (dec.), ethanol |
| 28 | do. | 2-chloro-4-nitrobenzoic acid | 98°, isopropylether-ethanol | 157° (dec.), ethanol |
| 29 | 2-[4-(4-fluorophenyl)-1-piperazinyl]ethylamine | 4-fluorobenzoic acid | 164°, ethanol | 228–230° (dec.), ethanol |
| 30 | 3-[4-(4-fluorophenyl)-1-piperazinyl]-n-propylamine | 4-fluorobenzoic acid | 144°, isopropanol | 178–180°, isopropanol |
| 31 | 2-[4-(4-fluorophenyl)-1-piperazinyl]ethylamine | 4-nitrobenzoic acid | 152°, methanol | 215–216° (dec.), ethanol |
| 32 | 3-[4-(4-fluorophenyl)-1-piperazinyl]-n-propylamine | do. | 120–121°, methanol | 139° (dec.), ethanol |
| 33 | 4-[4-(4-fluorophenyl)-1-piperazinyl]-n-butylamine | do. | 139°, methanol | 190° (dec.), ethanol |
| 34 | 3-[4-(3-chlorophenyl)-1-piperazinyl]-n-propylamine | 4-fluorobenzoic acid | 100°, isopropanol | 207–210° (dec.), isopropanol |
| 35 | do. | 4-nitrobenzoic acid | 109°, ethanol | 212–213° (dec.), isopropanol |
| 36 | 2-[4-(4-chlorophenyl)-1-piperazinyl]ethylamine | 4-fluorobenzoic acid | 176°, ethanol | 215–220° (dec.), ethanol |
| 37 | do. | 4-nitrobenzoic acid | 162°, ethanol | 215° (dec.), ethanol |
| 38 | 3-[4-(4-chlorophenyl)-1-piperazinyl]-n-propylamine | 4-fluorobenzoic acid | 150°, ethanol | 186–188° (dec.), ethanol |
| 39 | do. | 4-nitrobenzoic acid | 126°, ethanol | 223° (dec.) ethanol |

| Example No. | (4-aryl-1-piperazinyl)-alkylamine | Benzoic acid chloride or ester | m.p. (°C) recrystallisation solvent | Monohydrochloride, m.p. (°C), recrystallisation solvent |
|---|---|---|---|---|
| 40 | 3-[4-(4-methylphenyl)-1-piperazinyl]-n-propylamine | 4-fluorobenzoic acid | 127–128°, isopropanol | 191–193° (dec.) isopropanol |
| 41 | 2-[4-(2-methoxyphenyl)-1-piperazinyl]ethylamine | do. | 134–135°, isopropanol | 234–240°, isopropanol |
| 42 | do. | 4-nitrobenzoic acid | 156°, ethanol | 229°, methanol |
| 43 | 2-[4-(4-methoxyphenyl)-1-piperazinyl]ethylamine | 4-fluorobenzoic acid | 163–165°, ethanol | 240–238° (dec.), ethanol |
| 44 | 3-[4-(4-methoxyphenyl)-1-piperazinyl]-n-propylamine | 4-fluorobenzoic acid | 117–118°, isopropanol | 196–198° (dec.), isopropanol |
| 45 | do. | 4-nitrobenzoic acid | 110°, isopropanol | 190° (dec.), isopropanol |
| 46 | 2-[4-(3-trifluoromethylphenyl)-1-piperazinyl]ethylamine | 4-fluorobenzoic acid | 114–116°, isopropanol | 210–215°, isopropanol |
| 47 | do. | 4-nitrobenzoic acid | 118–119°, isopropanol | 189–190, isopropanol |
| 48 | 3-[4-(3-trifluoromethylphenyl)-1-piperazinyl]-n-propylamine | 4-fluorobenzoic acid | 92–93°, isopropanol | 178–180°, isopropanol |
| 49 | do. | 4-nitrobenzoic acid | 98–99°, isopropanol | 149–150° (dec.), isopropanol |

The amines used as starting materials in Examples 29, 31 and 47 can be prepared as follows:

A mixture of 1-(p-fluorophenyl)piperazine (33.2 g.), chloroacetonitrile (14.7 g.), anhydrous potassium carbonate (26.9 g.) and methanol (150 ml.) is heated under reflux with agitation for 10 hours. The mixture is filtered hot and the solution saturated with ammonia at ambient temperature. The solution is then hydrogenated under a pressure of 80 kg/cm$^3$ at 80°–100°C. for 2 hours in the presence of Raney nickel (4 ml.). After cooling and releasing the pressure, the Raney nickel is filtered off and the methanol evaporated. The residue is distilled at 0.05 mm.Hg. and 2-[4-(4-fluorophenyl)-1-piperazinyl]ethylamine is obtained, b.p. 138°–142°C/0.05 mm.Hg, $n_D^{20}$ = 1.548.

A mixture of 1-(m-trifluoromethylphenyl)piperazine (45.2 g.), chloroacetonitrile (14.7 g.), anhydrous potassium carbonate (26.9 g.) and methanol (150 ml.) is reacted and worked up as described in the last paragraph. 2-[4-(3-trifluoromethylphenyl)-1-piperazinyl]-ethylamine is obtained, b.p. 122°–125°C/0.05 mm.Hg, $n_D^{20}$ = 1.518.

EXAMPLE 50:

Method A.

A solution of 2-chlorobenzoyl chloride (17.5 g.) in benzene (30 ml.) is added with stirring to a mixture, cooled in ice, of 3-[4-(4-chloro-phenyl)-1-piperazinyl]-n-propylamine (25.4 g.) in benzene (20 ml.) and a 20 percent aqueous solution of sodium hydroxide (25 ml.) in the course of 45 minutes. The desired product appears in suspension in proportion to its being formed. After stirring for 15 hours at ambient temperature, the solid product is filtered off, washed with water and dried. After recrystallisation from isopropanol 1-(4-chlorophenyl)-4-[3-(2-chlorobenzamido)-1-propyl]-piperazine is obtained; m.p. 118°C.

The monohydrochloride is prepared by treating this base in solution in ethanol by the theoretical quantity of hydrogen chloride in solution in ethanol; m.p. 180°C (dec.)

Method B

A solution of 3-[4-(4-chlorophenyl)-1-piperazinyl]-n-propylamine (25.4 g.) in chloroform (50 ml.) is added slowly with cooling to a solution of 2-chlorobenzoyl chloride (17.5 g.) in chloroform (50 ml.). The mixture is allowed to stand for 15 hours at ambient temperature and then stirred in the presence of 10 percent ammonia aqueous solution (40 ml.). The organic phase is separated by decantation, washed with water and dried over sodium sulphate. The chloroform is then distilled off under reduced pressure. The residue is recrystallised from isopropanol; m.p. 118°C. The same product is obtained as in Method A.

Method C

Methyl 2-chlorobenzoate (17.1 g.), 3-[4-(4-chlorophenyl)-1-piperazinyl[-n-propylamine (25.4 g.) and xylene (40 ml.) are placed in a round-bottom flask and heated under reflux until the methanol/xylene azeotrope no longer distills off, or for about 30 hours. The xylene is then evaporated and the residue recrystallised from isopropanol. The same product is obtained as in Methods A and B.

EXAMPLES 51 TO 54:

Following Methods A, B and C of Example 50, a-(4-aryl-1-piperazinyl)alkylamine is heated with 2-chlorobenzoic acid chloride or ester. The compounds set out in the following Table are obtained from the specific (4-aryl-piperazino) alkylamines mentioned in the Table

| Example No. | (4-aryl-1-piperazinyl)-alkylamine | m.p. (°C) recrystallisation solvent | Monohydrochloride m.p. (°C) recrystallisation solvent |
|---|---|---|---|
| 51 | 2-[4-(3-trifluoromethylphenyl)-1-piperazinyl]-ethylamine | 145° ethanol | 196–200° isopropanol |
| 52 | 3-[4-(3-trifluoromethylphenyl)-1-piperazinyl]-n-propylamine | 65–66° isopropylether + petroleum ether | 172–173° isopropanol |

-Continued

| Example No. | (4-aryl-1-piperazi-nyl)-alkylamine | m.p. (°C) recrystalli-sation solvent | Monohydrochloride m.p. (°C) recrystallisa-tion solvent |
|---|---|---|---|
| 53 | 3-[4-(2-chlorophenyl)-1-piperazinyl]-n-propylamine | 54–57° isopropylether | 178–180° isopropanol |
| 54 | 2-[4-(4-chlorophenyl)-1-piperazinyl]-ethylamine | 156° isopropanol | 194–196° ethanol |

Pharmacological tests on the products of the Examples have given the following results. Acute Toxicity.

The LD 50 was calculated by the method of Karber & Behrens after intraperitoneal injection of the compounds into mice.

| Compound of Example No. | LD 50 (mg./kg.) |
|---|---|
| 1 | 541 |
| 2 | 100 |
| 3 | 479 |
| 4 | >1,500 |
| 5 | 520 |
| 6 | 395 |
| 7 | 1,625 |
| 8 | 875 |
| 9 | 900 |
| 10 | >1,500 |
| 11 | 138 |
| 12 | 1,275 |
| 13 | 271 |
| 14 | 130 |
| 15 | 110 |
| 16 | 175 |
| 17 | 116 |
| 18 | 93 |
| 19 | 158 |
| 20 | 137 |
| 21 | 80 |
| 22 | 150 |
| 23 | 160 |
| 24 | 1,438 |
| 25 | 533 |
| 26 | 138 |
| 27 | 258 |
| 28 | 194 |
| 29 | 238 |
| 30 | 138 |
| 31 | 525 |
| 32 | 250 |
| 33 | 780 |
| 34 | 300 |
| 35 | 300 |
| 36 | 667 |
| 37 | 1,500 |
| 38 | 392 |
| 39 | 250 |
| 40 | 79 |
| 41 | 88 |
| 42 | 225 |
| 43 | 1,250 |
| 44 | 88 |
| 45 | 53 |
| 46 | 184 |
| 47 | 400 |
| 48 | 200 |
| 49 | 184 |
| 50 | >1.000 |
| 51 | >1.000 |
| 52 | 131 |
| 53 | 125 |
| 54 | 470 |

The symptoms observed are mainly central, torpor in low doses, excitomotor syndrome in high doses, palpebral ptosis.

ANALGESIC ACTIVITY

The analgesic activity has been determined using the method of the heated plate (Eddy, J. Pharmacol., (1953) 107 p. 385) in a dose of 120 mg./kg. orally in mice. The temperature of the plate was 65°C. and 10 to 20 mice were used in each test. The percentage increase in the reaction time (as measured by licking of the front paws) is measured as compared with the untreated controls.

| Compound of Example No. | Dose Mg./kg. | %Increase in reaction time at the end of ½ hr. | 1 hr. | 1½ hr. | 2 hrs. |
|---|---|---|---|---|---|
| 1 | | 7 | 22 | 54 | 15 |
| 2 | | 16 | 36 | 44 | 47 |
| 3 | | 106 | 75 | 92 | 51 |
| 4 | | 5 | 20 | 5 | 16 |
| 5 | 31 | 5 | 7 | 0 | |
| 6 | | 40 | | 43 | |
| 7 | | 102 | | 64 | |
| 8 | | 28 | | 59 | |
| 9 | | 34 | | 55 | |
| 10 | | 27 | | 36 | |
| 11 | 120 | 265 | | 0 | |
| | 50 | 211 | | 18 | |
| | 25 | 94 | | 0 | |
| 12 | 120 | 0 | | 0 | |
| | 50 | 0 | | 10 | |
| 13 | 120 | 0 | | 9 | |
| | 50 | 0 | | 29 | |
| 14 | 50 | 21 | | 0 | |
| 15 | 50 | 16 | | 64 | |
| 16 | 50 | 90 | | 83 | |
| 17 | 50 | 9 | | 37 | |
| 18 | 50 | 136 | | 61 | |
| | 25 | 16 | | 9 | |
| 19 | 50 | 2 | | 20 | |
| 20 | 50 | 19 | | 25 | |
| 21 | 50 | 14 | | 12 | |
| 22 | 50 | 4 | | 55 | |
| 23 | 50 | 50 | | 46 | |
| 24 | 120 | 8 | | 0 | |

| Compound of Example No. | Dose (mg./kg.) | Percentage increase in time of reaction after ½ hr. | 1½ hrs. |
|---|---|---|---|
| 25 | 20 | 7 | 81 |
| 26 | 50 | 7 | 68 |
| 27 | 50 | 32 | 81 |
| 28 | 50 | 0 | 16 |
| 29 | 50 | 100 | 63 |
| 30 | 20 | 0 | 16 |
| 31 | 50 | 0 | 0 |
| 32 | 120 | 0 | 0 |
| 33 | 120 | 100 | 254 |
| 34 | 50 | 73 | 79 |
| 35 | 50 | 41 | 87 |
| 36 | 50 | 79 | 57 |
| 37 | 50 | 265 | 128 |
| 38 | 50 | 133 | 0 |
| 39 | 50 | 120 | 82 |
| 40 | 20 | 43 | 74 |
| 41 | 20 | 21 | 30 |
| 42 | 50 | 0 | 0 |
| 43 | 120 | 77 | 46 |
| 44 | 20 | 27 | 65 |
| 45 | 10 | 32 | 40 |
| 46 | 50 | 155 | 66 |
| 47 | 50 | 26 | 61 |
| 48 | 50 | 210 | 92 |
| 49 | 50 | 0 | 63 |
| 50 | 50 | 206 | 160 |

| Compound of Example No. | Dose (mg./kg.) | Percentage increase in time of reaction after | |
|---|---|---|---|
| | | ½ hr. | 1½ hrs. |
| 51 | 20 | 62 | 58 |
| | 50 | 7 | 36 |
| 52 | 20 | 9 | 48 |
| | 50 | 126 | 47 |
| 53 | 20 | 63 | 34 |
| | 50 | 83 | 34 |
| 54 | 20 | 31 | 25 |
| | 50 | 51 | 31 |
| | 20 | 40 | 27 |

CENTRAL DEPRESSANT ACTIVITY

This was determined by measuring the ability of the compounds to cause mice to go to sleep again who have been previously caused to go to sleep with sodiumhexobarbital and have woken up. Groups of 8 mice receive an intravenous injection of sodiumhexobarbital in a dose of 56 mg./kg. When each mouse awakes, it is injected intraperitoneally with the compound under test and the mouse is observed to see if it goes to sleep again, and, if it does, the duration of sleep is measured. In every case, the criterion for sleep is the loss of the righting reflex.

| Compound of Example No. | Intraperitoneal dose(mg./kg.) | Number of mice which go to sleep again | Mean duration of second sleep |
|---|---|---|---|
| 1 | 150 | 8/8 | 70 minutes |
| | 15 | 7/8 | 17 minutes |
| | 1.5 | 5/8 | 19 minutes |
| 2 | 15 | 8/8 | 25 minutes |
| | 1.5 | 3/8 | 6 minutes |
| 3 | 200 | 8/8 | 32 minutes |
| | 15 | 6/8 | 29 minutes |
| | 1.5 | 2/8 | 16 minutes |
| 4 | 150 | 6/8 | 19 minutes |
| | 15 | 5/8 | 18 minutes |
| | 1.5 | 4/8 | 11 minutes |
| 5 | 150 | 8/8 | 30 minutes |
| | 15 | 7/8 | 16 minutes |
| | 1.5 | 3/8 | 18 minutes |
| 6 | 150 | 8/8 | 41 minutes |
| | 15 | 4/8 | 13 minutes |
| 7 | 150 | 8/8 | 26 minutes |
| | 15 | 2/8 | 16 minutes |
| 8 | 150 | 8/8 | 61 minutes |
| | 15 | 8/8 | 25 minutes |
| | 1.5 | 5/8 | 13 minutes |
| 9 | 150 | 8/8 | more than 4 min. |
| | 15 | 5/8 | 16 minutes |
| | 1.5 | 3/8 | 11 minutes |
| 10 | 150 | 8/8 | 37 minutes |
| | 15 | 5/8 | 16 minutes |
| | 1.5 | 3/8 | 6 minutes |
| 11 | 15 | 8/8 | 38 minutes |
| | 1.5 | 8/8 | 28 minutes |
| 12 | 150 | 8/8 | 33 minutes |
| | 15 | 7/8 | 26 minutes |
| | 1.5 | 3/8 | 18 minutes |
| 13 | 150 | 8/8 | 32 minutes |
| | 15 | 7/8 | 18 minutes |
| | 1.5 | 3/8 | 11 minutes |
| 14 | 50 | 8/8 | 41 minutes |
| | 15 | 5/8 | 18 minutes |
| | 1.5 | 2/8 | 3 minutes |
| 15 | 15 | 6/8 | 29 minutes |
| | 1.5 | 4/8 | 25 minutes |
| 16 | 150 | 8/8 | 39 minutes |
| | 15 | 8/8 | 24 minutes |
| | 1.5 | 4/8 | 13 minutes |
| 17 | 15 | 2/8 | 14 minutes |
| | 1.5 | 3/8 | 13 minutes |
| 18 | 15 | 6/8 | 16 minutes |
| | 1.5 | 3/8 | 15 minutes |
| 19 | 15 | 8/8 | 21 minutes |
| | 1.5 | 7/8 | 18 minutes |
| 20 | 15 | 7/8 | 20 minutes |
| | 1.5 | 7/8 | 24 minutes |
| 21 | 15 | 7/8 | 18 minutes |
| | 1.5 | 5/8 | 18 minutes |
| 22 | 15 | 6/8 | 9 minutes |
| 23 | 15 | 8/8 | 29 minutes |
| | 1.5 | 5/8 | 15 minutes |
| 24 | 150 | 8/8 | >35 minutes |
| | 15 | 5/8 | 14 minutes |
| 25 | 150 | 8/8 | >50 minutes |
| | 15 | 5/8 | 20 minutes |
| 26 | 15 | 8/8 | 15 minutes |
| | 1.5 | 3/8 | 19 minutes |
| 27 | 15 | 7/8 | 32 minutes |
| | 1.5 | 8/8 | 13 minutes |
| 28 | 15 | 7/8 | 18 minutes |
| | 1.5 | 5/8 | 11 minutes |
| 29 | 15 | 8/8 | >50 minutes |
| | 1.5 | 5/8 | 20 minutes |
| 30 | 15 | 7/8 | 41 minutes |
| | 1.5 | 1/8 | 10 minutes |
| 31 | 150 | 8/8 | >50 minutes |
| | 15 | 8/8 | 21 minutes |
| | 1.5 | 4/8 | 11 minutes |
| 32 | 15 | 7/8 | >50 minutes |
| | 1.5 | 7/8 | 15 minutes |
| 33 | 150 | 8/8 | >75 minutes |
| | 15 | 8/8 | 15 minutes |
| | 1.5 | 7/8 | 13 minutes |
| 34 | 150 | 7/8 | >65 minutes |
| | 15 | 5/8 | 13 minutes |
| 35 | 150 | 8/8 | >65 minutes |
| | 15 | 6/8 | 11 minutes |
| 36 | 150 | 7/8 | 37 minutes |
| | 15 | 4/8 | 13 minutes |
| 37 | 150 | 6/8 | 22 minutes |
| | 15 | 6/8 | 12 minutes |
| 38 | 150 | 8/8 | 30 minutes |
| | 15 | 6/8 | 13 minutes |
| 39 | 150 | 7/8 | 30 minutes |
| | 15 | 3/8 | 7 minutes |
| 40 | 15 | 6/8 | 20 minutes |
| 41 | 15 | 7/8 | 26 minutes |
| | 1.5 | 6/8 | 19 minutes |
| 42 | 150 | 8/8 | 70 minutes |
| | 15 | 6/8 | 17 minutes |
| 43 | 150 | 8/8 | 38 minutes |
| | 15 | 7/8 | 25 minutes |

-Continued

| Compound of Example No. | Intraperitoneal dose(mg./kg.) | Number of mice which go to sleep again | Mean duration of second sleep |
|---|---|---|---|
| 44 | 15 | 5/8 | 25 minutes |
| 45 | 15 | 0/8 | — minute |
| 46 | 15 | 6/8 | 19 minutes |
| 47 | 150 | 4/8 | 20 minutes |
|    | 15  | 1/8 | 2 minutes |
| 48 | 150 | 8/8 | 51 minutes |
|    | 15  | 4/8 | 15 minutes |
| 49 | 15 | 3/8 | 10 minutes |
| 50 | 15 | 7/8 | 21 minutes |
|    | 1.5 | 3/8 | 12 minutes |
| 51 | 15 | 3/8 | 11 minutes |
| 52 | 15 | 8/8 | 22 minutes |
|    | 1.5 | 4/8 | 11 minutes |
| 53 | 15 | 6/8 | 20 minutes |
|    | 1.5 | 3/8 | 9 minutes |
| 54 | 15 | 3/8 | 13 minutes |

The new compounds can be used in human medicine as tranquilisers having minor neuroleptic properties and as agents for potentiating the effect of barbituric hypnotics. They can be made up in a form suitable for oral administration, in particular as tablets or capsules, or as suppositories. A suitable formulation for a tablet is as follows:

| | |
|---|---|
| Hydrochloride of the amide of Example 1 | 0.10 g. |
| starch | 0.0975 g. |
| magnesium stearate | 0.025 g |

A suppository may be made up as follows:

| | |
|---|---|
| Hydrochloride of the amide of Example 1 | 0.150 g. |
| semi-synthetic glyceride q.s.p. which will give a suppository of | 1.50 g. |

As agents for potentiating the effect of barbituric hypnotics, the compounds defined above can be used either alone or in association with barbiturates in the form of tablets, capsules or suppositories. A suitable formulation for a tablet is as follows:

| | |
|---|---|
| Hydrochloride of the amide of Example 1 | 0.05 g. |
| secobarbital | 0.05 g. |
| starch | 0.0975 g. |
| magnesium stearate | 0.025 g. |

A suitable formulation for a suppository is as follows:

| | |
|---|---|
| Hydrochloride of the amide of Example 1 | 0.05 g. |
| secobarbital | 0.100 g. |
| semi-synthetic glyceride q.s.p to give a suppository weighing | 1.50 g. |

The compounds of the invention can be used in medicaments as the bases or as their salts with non-toxic mineral and organic acids, especially hydrochloric acid. The compositions can be in a form suitable for oral, endorectal or parenteral administration, and in particular as tablets, pills or capsules containing 100 mg. of active substance, as suppositories containing 250 mg. of active substance, or as ampoules containing 100 mg. of active substance. The dosage is generally from 10 to 1,000 mg. per day by oral administration in the case of an adult.

ANTIHISTAMINIC EFFECT

The antihistaminic effect of the compounds of Examples 19 to 49 has been determined on the isolated guinea pig ileum in aerated Tyrode's solution at 37°C. For each compound, the ED 50 (in $\mu$g./ml. of Tyrode solution) is determined. The results obtained are given in the following table.

| Compound of Example No. | ED 50 |
|---|---|
| 1 | 0.020 |
| 2 | 0.050 |
| 3 | 0.050 |
| 4 | 0.020 |
| 5 | 0.015 |
| 6 | 0.10 |
| 7 | 0.015 |
| 8 | 0.10 |
| 9 | 0.050 |
| 10 | 0.050 |
| 11 | 0.050 |
| 12 | 0.25 |
| 13 | 0.025 |
| 14 | 0.075 |
| 15 | 0.012 |
| 16 | 0.25 |
| 17 | 0.037 |
| 18 | 0.020 |
| 19 | 0.20 |
| 20 | 0.08 |
| 21 | 0.025 |
| 22 | 0.75 |
| 23 | 0.025 |
| 24 | 0.045 |
| 25 | 0.005 |
| 26 | 0.05 |
| 27 | 0.75 |
| 28 | 0.06 |
| 29 | 0.125 |
| 30 | 0.011 |
| 31 | 0.04 |
| 32 | 0.0065 |
| 33 | 0.004 |
| 34 | 0.004 |
| 35 | 0.003 |
| 36 | 0.10 |
| 37 | 0.13 |
| 38 | 0.010 |
| 39 | 0.005 |
| 40 | 0.010 |
| 41 | 0.30 |
| 42 | 0.15 |
| 43 | 0.80 |
| 44 | 0.15 |
| 45 | 0.05 |
| 46 | 0.12 |
| 47 | 0.025 |
| 48 | 0.020 |
| 49 | 0.015 |
| 50 | $\geq 0.25$ |
| 51 | $\geq 0.25$ |
| 52 | $\geq 0.25$ |
| 53 | $\geq 0.25$ |
| 54 | $\geq 0.25$ |

It has further been found that the compound of the formula

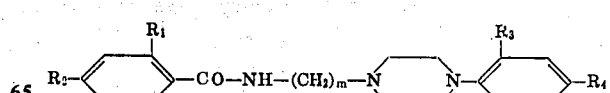

where $R_1$, $R_2$, $R_3$ and $R_4$ have the significances tabulated below

| Example No. | $R_1$ | $R_2$ | m | $R_3$ | $R_4$ |
|---|---|---|---|---|---|
| 24 | H | $NO_2$ | 2 | H | H |
| 11 | d° | F | 3 | d° | d° |
| 42 | d° | $NO_2$ | 2 | $CH_3O$ | d° |
| 33 | d° | d° | 4 | d° | F |
| 41 | d° | F | 2 | $CH_3O$ | H |
| 23 | Cl | H | 4 | H | d° | exhibit valuable antitussive properties, the preferred compounds in this respect being those of Examples 24, 33, 23 and 41. The compounds may be in a form suitable for oral, endorectal or local administration, for instance as tablets, pills, capsules, suppositories, syrups, potions, collutories or aerosols. For example, the compound of Example 24 may be administered as capsules containing 20 mg. thereof, the daily dosage generally ranging from 40 to 100 mg. in the case of an adult.

It has also been found that the compounds of the formula

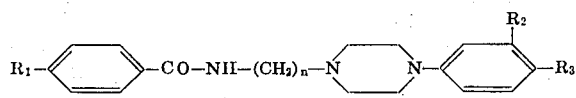

where $R_1$, $R_2$, $R_3$ and n have the significances tabulated below

| Example No. | $R_1$ | $R_2$ | $R_3$ | n |
|---|---|---|---|---|
| 33 | $NO_2$ | H | F | 4 |
| 31 | $NO_2$ | H | F | 2 |
| 46 | F | $F_3C$ | H | 2 |
| 29 | F | H | F | 2 |
| 47 | $NO_2$ | $F_3C$ | H | 2 |
| 49 | $NO_2$ | $F_3C$ | H | 3 |
| 13 | F | H | H | 4 | exhibit valuable anti-inflammatory properties, the preferred compounds in this respect being those of Examples 46, 33, 29 and 47.

The compounds were tested as follows.

Homogeneous bathes of male rats weighing from 120 to 150 g. were formed. Carragenine was injected into plant surface of paws (0.05 ml of a 0.2 per cent suspension in physiological aqueous salt solution) and the compounds to be tested were administered orally one hour before carragenine injection. The percentage of inhibition of oedema was determined 3 hours after the carragenine injection, in accordance with the method described by Winter, Proc. Exp. Biol. 1962, 3, 514.

The results are tabulated below.

| Example No. | Dose mg./kg. (p.o.) | Percentage of reduction of oedema |
|---|---|---|
| 31 | 60 | 56 |
|  | 30 | 28 |
| 33 | 60 | 67 |
|  | 30 | 73 |
|  | 10 | 60 |
|  | 5 | 25 |
| 47 | 60 | 65 |
|  | 30 | 40 |
| 49 | 60 | 46 |
|  | 30 | 36 |
| 13 | 60 | 52 |
|  | 30 | 28 |
| 29 | 60 | 64 |
|  | 30 | 40 |
| 46 | 60 | 71 |
|  | 30 | 38 |
| Phenylbutazone (control) | 60 | 51 |
|  | 30 | 42 |

We claim:

1. The substituted benzoic acid amide which is 1-(2-methoxy-phenyl)-4-[2-(4-fluoro-benzamido)-ethyl]-piperazine.

* * * * *